US006629790B2

(12) United States Patent
Miyasaka et al.

(10) Patent No.: US 6,629,790 B2
(45) Date of Patent: Oct. 7, 2003

(54) TERMINAL PRINTING APPARATUS, METHOD OF PROCESSING RECEIVED DATA THEREIN, AND COMPUTER PROGRAM PRODUCT FOR ACHIEVING THE METHOD

(75) Inventors: Masayo Miyasaka, Suwa (JP); Toshiaki Koike, Suwa (JP); Hidetake Mochizuki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 09/810,824

(22) Filed: Mar. 16, 2001

(65) Prior Publication Data

US 2001/0022912 A1 Sep. 20, 2001

(30) Foreign Application Priority Data

Mar. 17, 2000 (JP) ........................................ 2000-077110

(51) Int. Cl.[7] .............................................. B41J 11/44
(52) U.S. Cl. .............................. 400/76; 400/61; 400/70
(58) Field of Search ............................ 400/76, 70, 61; 358/1.15, 1.16

(56) References Cited

U.S. PATENT DOCUMENTS

| 4,452,136 | A | | 6/1984 | Boynton et al. | |
|---|---|---|---|---|---|
| 4,831,553 | A | * | 5/1989 | Yoshino | 358/1.12 |
| 5,104,245 | A | * | 4/1992 | Oguri et al. | 400/68 |
| 6,031,976 | A | * | 2/2000 | Koakutsu et al. | 358/1.16 |
| 6,038,376 | A | * | 3/2000 | Noguchi | 358/1.15 |
| 6,147,765 | A | * | 11/2000 | Yoneda | 358/1.15 |
| 6,285,459 | B1 | * | 9/2001 | Koakutsu et al. | 358/1.15 |
| 2001/0004241 | A1 | * | 6/2001 | Fukano et al. | 340/692 |

FOREIGN PATENT DOCUMENTS

| EP | 0 769 755 | | 4/1997 | |
|---|---|---|---|---|
| EP | 0 809 176 A2 | * | 11/1997 | G06F/3/12 |
| EP | 0 917 093 | | 5/1999 | |
| JP | 02188281 A1 | * | 7/1990 | B41J/5/30 |
| JP | 6-227059 | | 8/1994 | |
| JP | 9-190805 | | 7/1997 | |
| JP | 10-149269 | | 6/1998 | |
| JP | 10-333856 | | 12/1998 | |

OTHER PUBLICATIONS

IBM Technical Disclosure Bulletin, NN8711236, vol. 30, Issue No. 6, p. 236, Nov. 1987.*
RD 298051, Feb. 1989.*

* cited by examiner

Primary Examiner—Charles H. Nolan, Jr.
(74) Attorney, Agent, or Firm—Michael T. Gabrik

(57) ABSTRACT

When a communications terminal has stopped operating because it is off-line, data received from a host is efficiently stored to a receive buffer so that receive buffer full states cannot easily occur. A data interpreter interprets the receive buffer content in the input order. An action buffer stores interpreted commands. A command execution controller executes commands in the action buffer in first-in first-out order. The data interpreter continues interpreting the received data even when operation of the command execution controller is stopped, and kills without storing to the action buffer any real-time commands detected by the data interpreter.

30 Claims, 6 Drawing Sheets

TERMINAL PRINTING APPARATUS, METHOD OF PROCESSING RECEIVED DATA THEREIN, AND COMPUTER PROGRAM PRODUCT FOR ACHIEVING THE METHOD

BACKGROUND OF THE INVENTION

1. Field of the Invention

The present invention relates to a communication terminal device such as a terminal printer, terminal display, deposit terminal, or other such device used, for example, in an automated transaction machine (ATM), cash dispenser (CD), point-of-sale (POS) system, or kiosk terminal installed in a retail store. More particularly, the present invention relates to processing received data temporarily stored in a receive buffer when the terminal device stops its native operation because of a prescribed condition such as an off-line state.

2. Description of Related Art

Conventional transaction devices such as ATMs, CDs, POS terminals, kiosk terminals, and the like contain a central processing device (such as a personal computer or host terminal) and various terminal devices providing specific functions. Exemplary of these terminal devices are printers, displays, cash dispensing and storage devices, and bar code readers. The central processing device, referred to as the host device below, systematically controls the overall operation of the ATM, POS, or other terminal (referred to below as transaction devices), as well as individual control of the other terminal devices built into the transaction device. More specifically, the host sends control commands and other relevant data to a particular terminal device to control the operation of the terminal device. Most such terminal devices built into the transaction device are connected to the host device by way of a serial port (RS-232C or other) connection whereby commands and process data such as print data are transferred.

An interface circuit is built into each of these devices, and a control line for controlling communication is provided in the connection. For example, the terminal device can output a data terminal ready (DTR) signal to notify the host device that the terminal device is in a data receivable state. When the host detects an active DTR signal, it sets the data set ready (DSR) signal to an active state to confirm that both devices are enabled for data communication before sending any data, and thereby prevents data loss. Terminal devices such as the above are referred to in this specification as "communication terminal devices."

Conventionally a communication terminal device such as a terminal printer (referred to as simply a printer below) stores data received from the host to a receive buffer. The stored received data is interpreted by a command interpreter in the sequence the data is received. After interpreted, the data is removed from the receive buffer to make space in the receive buffer. If the interpreted data is a command, the command is executed and then deleted from the receive buffer.

If the terminal device has gone off-line because the cover is open, a paper jam occurred, or some other reason has caused the terminal device to stop its native operation, the command interpreter also stops interpreting the received data and thus stops operation. If the host continues to send data when the terminal device is off-line, the receive buffer soon becomes full (a receive buffer full state) because processing of data in the receive buffer has stopped.

When the receive buffer becomes full, data received thereafter cannot be stored to the receive buffer and is therefore lost. To prevent this, the terminal device sets the DTR signal inactive when the receive buffer becomes full, and thus stops data transmission from the host.

On the other hand, when the communication terminal device goes off-line, the host needs to confirm the communication terminal device status and run a process appropriate to the communication terminal device status. The host must therefore send a control command to the communication terminal device which is in the offline state causing the communication terminal device to perform a specific operation such as reporting the device status to the host. Some communication terminal devices accomplish this by providing a special type of command data, referred to below as a real-time command, that is executed as soon as the command is received by the communication terminal device and is then stored to the receive buffer. The real-time command is stored to the receive buffer after execution to prevent the loss of binary data when the code sequence mistakenly processed as a real-time command is actually part of the binary data sequence of an image data stream, for example.

When the communication terminal device goes off-line, the host typically sends frequent real-time commands to the communication terminal device in order to determine the status of the communication terminal device in detail. These real-time commands are executed as soon as received by the communication terminal device and are then stored to the receive buffer as mentioned before.

On the other hand, because the command interpreter does not interpret data stored in the receive buffer while off-line, the receive buffer soon becomes filled with the real-time commands sent from the host and other data previously stored therein. Once the receive buffer is full, the host device is prohibited to send further data, and the communication terminal device therefore cannot be controlled by the host device.

OBJECT OF THE INVENTION

An object of the present invention is therefore to prevent loss of receive buffer functionality as a result of received data unnecessary accumulating in the receive buffer. For example, interpreting data stored in the receive buffer continues even when a native operation of a communication terminal device has stopped due to an error, for example, and then the requested operation will be performed after communication terminal device operation is again possible.

SUMMARY OF THE INVENTION

In order to achieve the above object, the communication terminal apparatus of the present invention includes interface means for performing data communication with a host apparatus; storage means for storing data; first data processing means for storing the data received by the interface means in the storage means; interpretation means for reading the received data stored in the storage means in the order in which the received data are stored, and for interpreting the read data; detection means for detecting predetermined data from the received data interpreted by the interpretation means; second data processing means for storing control information corresponding to the received data interpreted by the interpretation means in the storage means in the order in which the received data are interpreted, except for the predetermined data detected by the detection means; and first control means for controlling the communication terminal apparatus based on the control information stored in the storage means.

According to this aspect of the present invention, the control information based on predetermined data, such as a real command, which has already been executed, is not stored in the storage means, thereby enabling the efficient use of the storage means.

In this case, the communication terminal apparatus may preferably further include deletion means for deleting the received data read by the interpretation means from the storage means.

The storage means may preferably further include a first area for storing the received data and a second area for storing the control information. In a printer, which serves as the communication terminal apparatus, a large amount of various items of data, such as control commands and print data, are sent to a receiving buffer. Accordingly, the sequentially analyzing and processing the contents of the receiving buffer, as is performed in the present invention, is very effective for the efficient use of the receiving buffer. In this case, the control information may preferably include printing control information and print data, and the second data processing means may preferably store the printing control information and the print data while relating them to each other. The storage means may preferably include a printing control information area for storing the printing control information and a print data area for storing the print data. The second data processing means may preferably add addresses within the print data area in which the print data related to the printing control information are stored to the printing control information, and may store the printing control information in the printing control information area.

The aforementioned communication terminal apparatus may preferably further include data detection means for detecting the predetermined data from the received data before the received data are stored in the storage means by the first data processing means; and second control means for controlling the communication terminal apparatus with a higher priority than the first control means according to the predetermined data detected by the data detection means. In this case, the second control means may send status data of the communication terminal apparatus to the host apparatus according to the predetermined data.

According to the above-described aspect of the present invention, a real time command, which is predetermined data, is executed before it is stored in the receiving buffer or simultaneously with being stored therein. It is thus possible for the host apparatus to perform predetermined control by the real time command even in an offline status. Software of the host apparatus is also able to know details of the status of the communication terminal apparatus regardless of the operating status of the communication terminal apparatus, thereby making it possible to perform appropriate processing according to the status.

The above-described communication terminal apparatus may preferably further include status detection means for detecting a predetermined status of the communication terminal apparatus; and interruption means for interrupting an operation of the first control means according to a detection result of the status detection means. In this case, the interpretation means may preferably interpret the received data even if the first control means is in an interrupting state.

With the above-described arrangement, the interpretation means interprets the data even if the first control means is in an interrupting state. Accordingly, even if the operation of the communication terminal apparatus is interrupted due to the opening of the cover or a paper jam, command analyses are performed on the data stored in the receiving buffer. Thus, the set-up operation for executing commands (for example, set-up operation for print data) can be performed, and the received data storage area of the storage means can be released.

The present invention can also be implemented by a received data processing method for use in the above-described communication terminal apparatus, and operations and advantages similar to those offered by the communication terminal apparatus can be achieved. Additionally, the received data processing method for use in the communication terminal apparatus of the present invention may preferably be performed by using a computer, such as a microprocessor, installed in the communication terminal apparatus. In this case, a computer program product, such as a computer readable recording medium, which stores a computer program for implementing the above method by using a computer, is also included in the technical scope of the present invention.

Other objects and attainments together with a fuller understanding of the invention will become apparent and appreciated by referring to the following description and claims taken in conjunction with the accompanying drawings.

Figure 1:
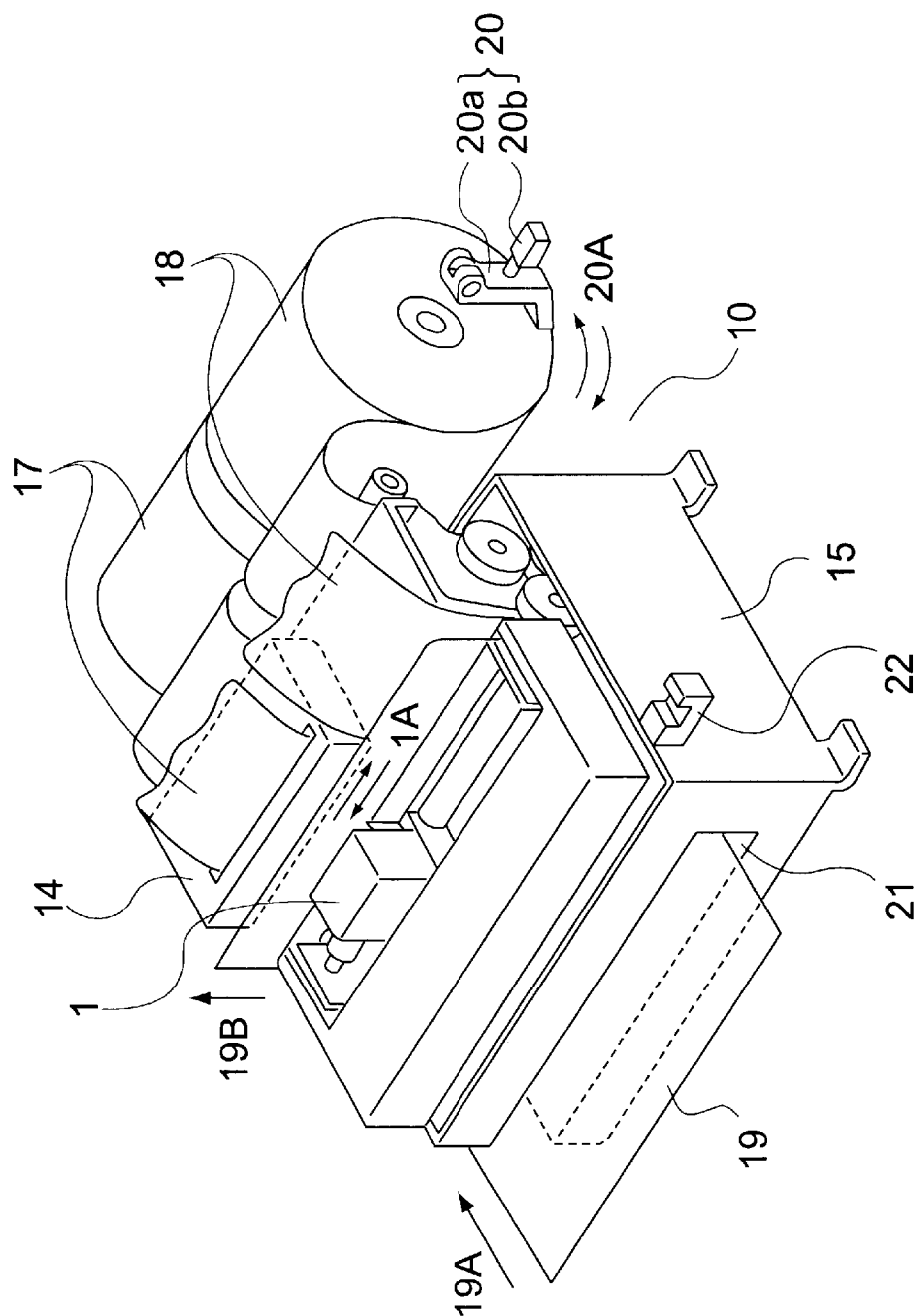
FIG. 1 shows a terminal printer used in a POS system as exemplary of a communication terminal device according to an embodiment of the present invention.

KEY TO THE FIGS.

1 print head
10 printer
17 receipt paper
18 journal paper
19 slip form
30 interface
31 receiver section
32 receive buffer
33 data interpreter
34 action buffer
35 transmission section
36 status detector
37 print buffer
38 controller
39 printer mechanism
40 CPU
42 printer mechanism drive circuit
73 real-time data interpreter 79 common status detector
80 status transmitter
87 printer mechanism status detector
88 communication enabling unit
90 host device (PC)
92 communication port
93 host OS
94 POS OS
95 basic OS
96 POS control OS
97 POS application software
98 other application software
100 to 103 POS communication terminal drivers
110 customer display
112 display processor
115 cash drawer

DESCRIPTION OF THE PREFERRED EMBODIMENTS

The preferred embodiments of the present invention are described below with reference to the accompanying figures. As described above, this invention can be applied in various types of communication terminal devices. The embodiments described below therefore use by way of example only a POS system terminal printer, that is, a printer such as the type widely used in ATMs, POS terminals and kiosk terminals. Such printers typically handle a large number of status flags and exchange a large amount of data with the host device.

FIG. 1 shows a POS system terminal printer 10 as an example of a communication terminal device according to the present invention. This printer 10 prints to such print media as slip forms 19, journal paper 18, and receipt paper 17.

Slip forms 19 are cut-sheet forms of various shapes. When the slip form 19 is inserted in the direction of arrow 19A from the slip form insertion opening 21 at the front of the printer 10, a paper detector (not shown in the figure) detects the form, which is then conducted to the print head 1 through the paper transportation path inside the case 15. The print head 1 then travels sideways in the direction of arrows 1A to print as the slip form 19 is advanced further in the direction of arrow 19B and eventually ejected. It should be noted that the print head 1 is a wire dot head in this exemplary embodiment, but could be a different type of print head such as a thermal print head, ink-jet print head, or even line print head which can eliminate the structure to move the print head in the arrow 1A direction.

Both journal paper 18 and receipt paper 17 are continuous forms paper supplied in this exemplary embodiment of printer 10 as roll paper. These continuous forms 17, 18 are supplied to the print head 1 through the case 15 from the direction opposite the slip form 19 transportation direction. After receipt data is printed, receipt paper 17 is guided to a cutter unit 14 whereby the receipt paper 17 is cut so that the receipt can be given to the customer.

Specific journal entry data to be retained by the store is printed to journal paper 18, which is then taken up and stored on a roll by a take-up device not shown in the figures. A near-end detector 20 for detecting when the roll is nearly depleted is provided near continuous forms 17, 18.

The near-end detector 20 has a detection lever 20a that contacts a side of the roll paper as shown in FIG. 1 and swings in the direction of arrow 20A according to the outside diameter of the roll, and a switch 20b that is turned on and off by the detection lever 20a. When the end of the roll approaches and the outside diameter of the roll thus becomes sufficiently small, detection lever 20a swings in toward the center of the roll, thus causing switch 20b to turn off. This makes it possible to detect that the end of the roll is approaching.

There is also a cover (not shown in the figure) over the printer case 15. The cover is closed except when replenishing receipt paper 17 or journal paper 18, and is closed while printing. A cover detector 22 is therefore also disposed to the case 15 for detecting cover opening and closing so that when the cover is open the printer 10 automatically assumes a hold state during which a process such as interrupting printing is accomplished.

Figure 2:
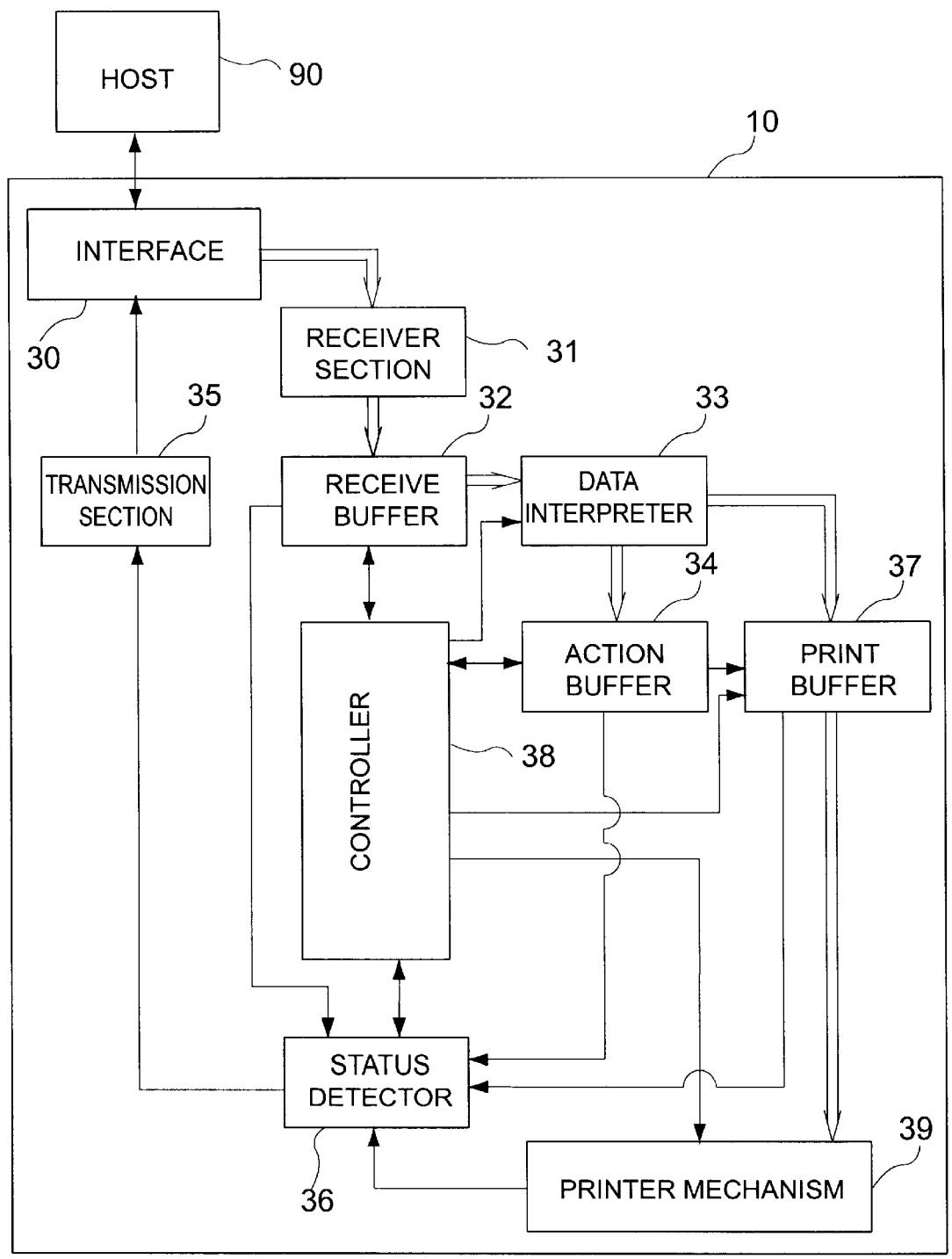
FIG. 2 is a function block diagram of a POS system for describing the basic configuration of a first preferred embodiment of the present invention.

A first preferred embodiment of the present invention is described next below with reference to FIG. 2. FIG. 2 is a function block diagram of a POS system for describing the basic configuration of the present embodiment. The host 90 controls overall POS system operation in addition to controlling operation of the various terminal devices connected to the POS system by means of data communication therebetween. To simplify the following explanation of the invention, this embodiment is described with reference to a terminal printer 10 only below.

The printer 10 is controlled by control commands and print data sent from the host device 90 to the printer 10. The host 90 can be a general purpose personal computer. The host 90 must confirm the printer 10 status in order to control the printer 10, and the printer 10 can return status information to the host 90 in response to a status request from the host 90.

The host 90 and printer 10 are typically connected by way of a serial communications port drivers (RS-232C), for example. Printer control commands and print data sent from the host 90 are received by the receiver section 31 through the printer 10 interface 30. The received data is stored to the receive buffer 32. Data stored in the receive buffer is then interpreted in the same sequence in which it was written to memory, i.e., first-in-first-out (FIFO) manner.

The data interpreter 33 both interprets the received data and performs a set-up process in preparation for running the process corresponding to the received data. For example, if print data is received, the print data is prepared in the print buffer 37. Furthermore, if a font style command is received, for example, since the command can be processed without requiring any accompanying mechanical operation, the style information provided by the command is stored to the memory of controller 38 when the command is interpreted. However, if a print command, paper cutting command, or other command requiring some mechanical operation is received, the command is interpreted but is not run. Such commands are therefore stored to the action buffer 34 for later execution.

In other words, the data interpreter 33 prevents data from accumulating in the receive buffer by interpreting data in the receive buffer 32 so that executable commands are executed and commands that cannot be immediately executed are stored in the action buffer 34 after accomplishing the set-up process appropriate to the command.

After the printer 10 returns on-line and can operate its native operation, i.e., printing operation, command information stored to the action buffer 34 is read out by the controller 38 and the corresponding print or other operation is then performed. The command information stored in the action buffer 34 can be stored either as sent from the host 90, or can be stored after converting it for internal processing by the printer 10.

Regardless of the format in which this command information is stored, a print command defined on the printer side is stored to the action buffer 34 to accomplish a printing operation if the data sent from the host is print data. The print command in this case must contain information identifying what specific print data stored in the print buffer 37 is to be printed by the print command. The controller 38 reads the content of the action buffer 34 in the stored sequence (FIFO).

If a print command is detected, the controller 38 controls the print buffer 37 and printer mechanism 39 so that the printer mechanism 39 prints the correlated print data stored in the print buffer 37.

The status detector 36 is connected to and detects and stores the status of the printer mechanism 39, receive buffer 32, and action buffer 34, and sends this status information to the host 90 as requested by way of transmission section 35 and interface 30.

Figure 3:
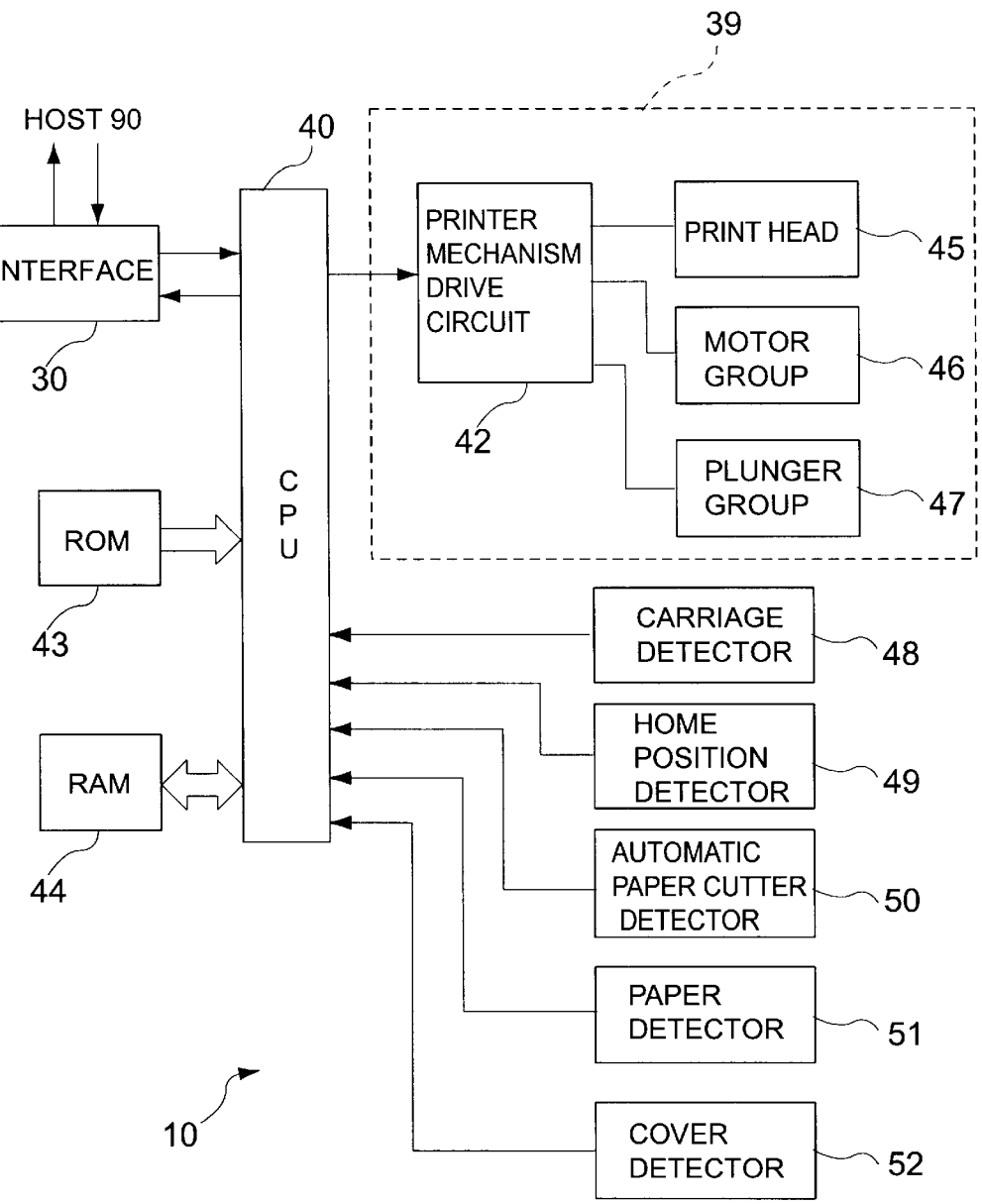
FIG. 3 is a block diagram of a typical configuration of control circuitry for achieving the functions of the first preferred embodiment shown in FIG. 2.

FIG. 3 is a block diagram showing the basic configuration of a control circuit achieving the functions of the exemplary embodiment of this invention shown in FIG. 2.

The above-noted printer mechanism 39 comprises print head 45, motor group 46, plunger group 47, and print mechanism drive circuit 42 for driving these other components.

The printer mechanism 39 is further connected to a carriage detector 48, home position detector 49, automatic paper cutter detector 50, paper detector 51, cover detector 52, and CPU 40. Paper cutter errors, cover open errors, and other errors can be detected using these various detectors 48 to 52.

ROM 43 stores data and software (firmware), i.e., a control program for execution by the CPU 40 for accomplishing the functions of the various parts shown in FIG. 2. The CPU 40 reads the program codes from ROM 43 to accomplish the various functions.

RAM 44 functions as receive buffer 32, action buffer 34, print buffer 37, and as a storage device for other temporally necessary data. It will be obvious to one skilled in the related art that these buffers 32, 34, 37 need not be limited to RAM, but can be achieved using registers or non-volatile memories, for example. Data communication with the host 90 is accomplished by way of the interface 30.

Figure 4:
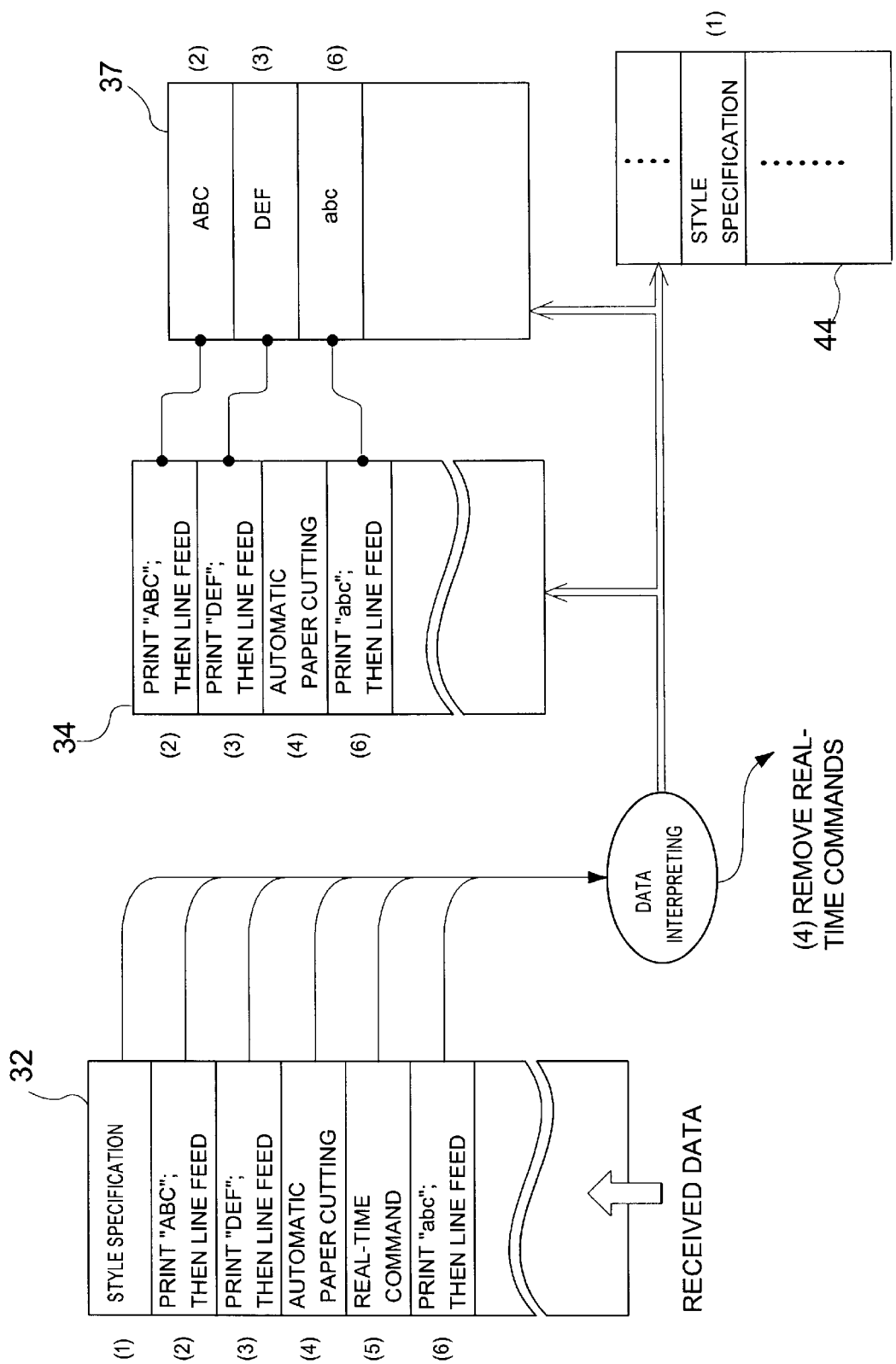
FIG. 4 is a conceptual illustration of how data received from the host 90 is processed through command interpretation after being stored to the receive buffer 32.

FIG. 4 conceptually illustrates how data received from the host 90 and stored to receive buffer 32 is processed by way of the command interpreter.

Let us assume below that data is received from the host 90 in the following order: (1) font style command, (2) a command for printing "ABC" followed by a line feed, (3) a command for printing "DEF" followed by a line feed, (4) a paper cutting command, (5) a real-time command (further described below), and (6) a command for printing "abc" followed by a line feed. Please note that the command for printing characters is actually character codes themselves, and a control character of "LF" following the character codes indicates termination of the command.

The data interpreter 33 then reads and interprets in the sequence (1) through (6) in which the data was stored to the receive buffer 32, that is, first-in first-out (FIFO) sequence. When command (1) is read from receive buffer 32, it is recognized as a font style specification. In this case the interpreter sets the style information in memory in conjunction with the following print data. Command (1) is then removed from receive buffer 32 at this stage. Here, removing of the data or a command in the receive buffer is not limited to erasing them or replacing them with null data but may include any operations which make it possible to store newly received data in the area of the receive buffer storing the data to be removed. For example, in a receive buffer having an input pointer for pointing to an input address where the newly received data is to be stored, the pointer can be changed in the removing process to point to the address where the old data to be removed is stored.

When command (2) is read and interpreted, it is recognized as a command requiring printing and a line feed. In this case the print data ("ABC") is processed according to the style information in RAM 44 and a print image corresponding to the print data is developed to the print buffer 37, and then operating information requiring a print operation and a line feed operation is stored to the action buffer 34 for later execution. As noted above, the operation information corresponding to the commands (2) and print image data "ABC" in the print buffer 37 are stored with a correlation therebetween. More precisely, a function routine is defined which has a parameter of a print image area in the print buffer 37 and executes printing of the image data on a recording media such as receipt paper followed by line feed operation. In the above procedure, the function call is registered in the action buffer 34 with start and end addresses of the "ABC" developed area as the parameter of the function. When this process ends, the data (2) is removed from the receive buffer 32. Note that this step removing data from the receive buffer 32 is performed for each received data batch processed, and further mention thereof is thus omitted below.

Command (3) is likewise read from the receive buffer 32 and interpreted to similarly store the print image data and operation information to the print buffer 37 and action buffer 34. Command (4) is then read and interpreted. Because the process specified by command (4) is cutting the paper, only the corresponding operation information is stored to the action buffer 34 (i.e., no data is stored to the print buffer 37). In this case, another function routine is defined which has no parameter and executes cutting operation, and a function call of this function is registered in the action buffer 34.

Command (5) stored to receive buffer 32 is a real-time command. When the command interpreter detects a real-time command, the real-time command data is killed. The specific content of real-time commands is further described below.

Command (6) is a print command similar to commands (2) and (3), and is therefore handled in the same way.

Figure 5:
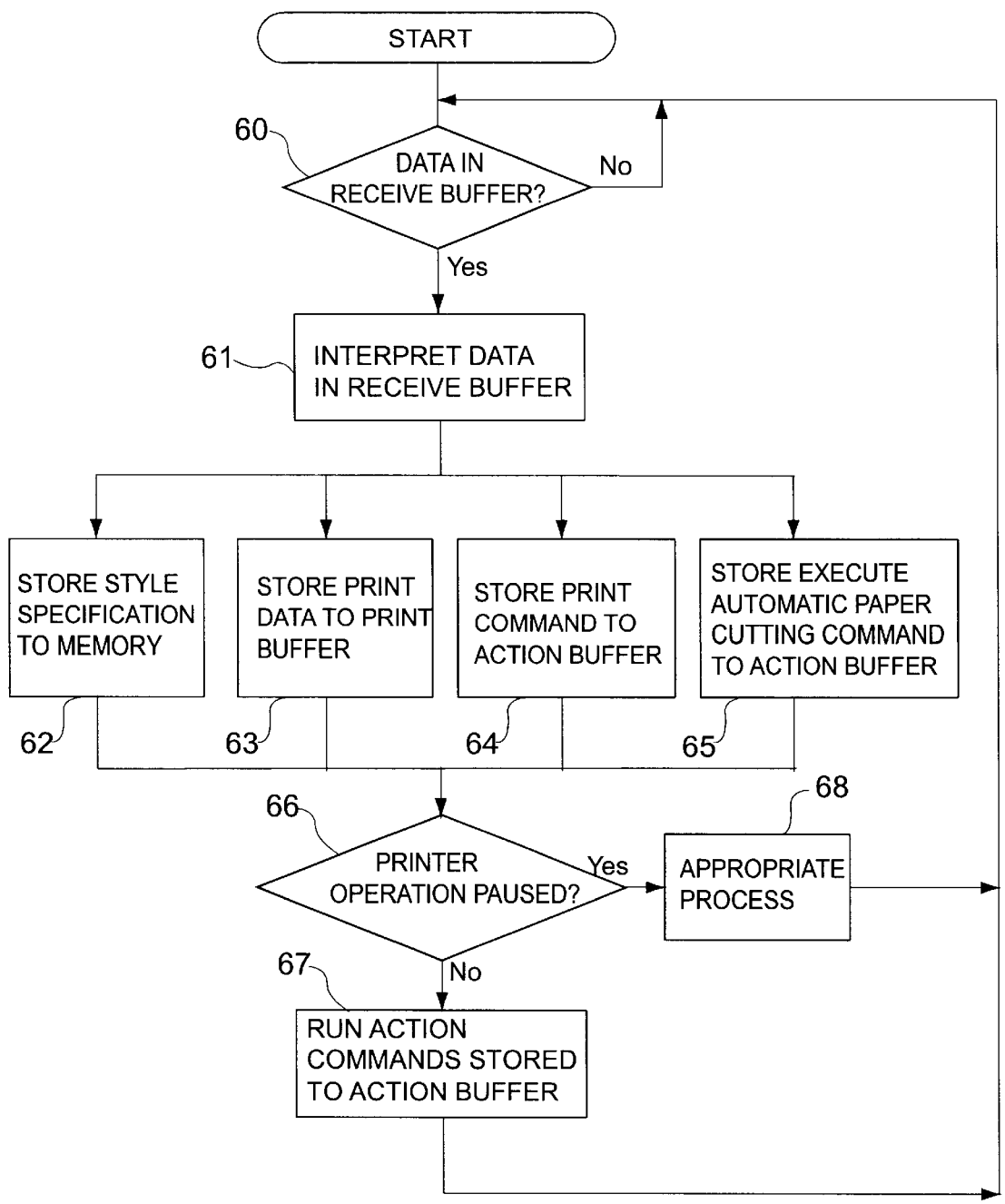
FIG. 5 is a flow chart for describing the operation of the first preferred embodiment of the present invention.

These operations are further described below with reference to the flow chart shown in FIG. 5 for this first exemplary embodiment of the invention.

When this process starts, data interpreter 33 checks if any data is stored to receive buffer 32 (step 60). If there is, it interprets the data in the order stored (step 61), i.e., FIFO manner, sets any style information according to the interpreted data (step 62), develops the print data in the print buffer 37 (step 63), stores print operation information to the action buffer 34 (step 64), or stores paper cutting operation information to the action buffer 34 (step 65) as appropriate. It will be apparent to one skilled in the related art that these steps 62 to 65 are shown by way of example only, and the processes actually performed will vary according to the command(s) received.

Whether printer operation, the native operation of the printer, is temporarily interrupted is then determined (step 66). If the printer is on-line and operating, the operation information stored in the action buffer 34 is read out and then a corresponding operation is performed (step 67). The temporally interrupted state of the printer is established in, for example, its off-line state.

If printer operation is interrupted, a specific process is performed according to why printer operation was interrupted (step 68). If a paper jam causes the printer to go off-line, for example, the paper transportation motor might be stopped and an LED indicator turned on, and/or the status stored to a specific storage area. When the specific process ends, the process of any data in the receive buffer is performed (step 60) irrespective of the printer operation being interrupted.

A second embodiment of the present invention is described next below.

Figure 6:
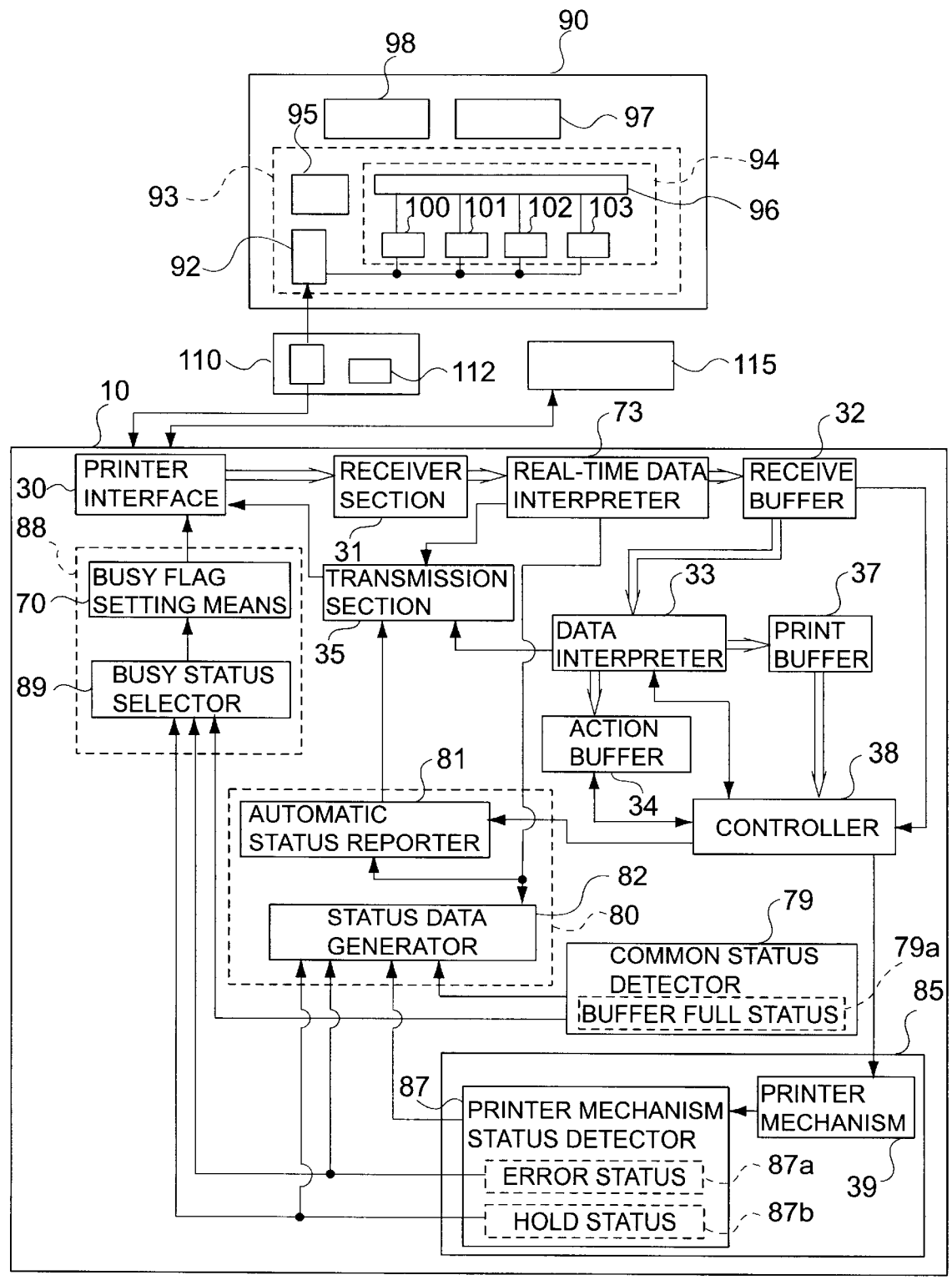
FIG. 6 is a function block diagram of a second preferred embodiment of the present invention.

FIG. 6 shows an exemplary POS system comprising a personal computer (PC) 90 as the host, and a terminal printer 10 according to this preferred embodiment of the invention as a communication terminal. The customer display 110 and cash drawer 115 are electrically connected by way of the serial communications port (RS-232C) driver 92 of the PC 90 in this POS system. The PC 90 is further connected to the customer display 110 and printer 10 by way of respective RS-232C interfaces for sending and receiving data therebetween.

The cash drawer 115 is connected to the printer 10. The PC 90 controls the cash drawer 115 by sending a specific command to the printer 10. It should be noted that the customer display 110 has a pass-through function by which the customer display passes the data received from the host to an other device connected thereto, e.g., a terminal printer, and the display processor 112 processes commands and display data from the PC only when the customer display 110 is selected by a predetermined command from the PC. The printer 10 has like functions, and processes commands and print data from the PC only when selected.

The DTR signal from customer display 110 is input to the CS signal terminal of the PC 90 to avoid conflicting with the DTR signal from the printer 10. The customer display 110 does not send status information to the PC 90, and there is therefore no conflict with status data from the printer 10.

Being thus connected, the operating system (OS) 93 of the host PC 90 comprises, in addition to the serial port driver 92, the POS OS 94 and a basic OS 95 for controlling the keyboard, display, and other common personal computer components, and the application software 97 for controlling these components.

The POS OS 94 comprises a receipt printing driver 100 used for making the printer 10 print to receipt paper, journal paper, or other continuous forms paper; a slip printing driver 101 for printing to slip forms; a customer display driver 102 for controlling the customer display 110; a cash drawer driver 103 for controlling the cash drawer 115; and further a POS control OS 96 for collectively controlling these device drivers.

The basic OS 95 and POS OS 94 control operation of the POS application software 97 and other application software 98 such as spreadsheets run on the host 90.

When data is received through the interface 30 of printer 10, an interrupt in the processing of CPU 40 is issued and receiver section 31 which is realized by an interrupt process of the CPU 40 reads data from the interface 30. Data captured from the interface 30 is stored to the receive buffer after passing through real-time data interpreter 73 during the same interrupt process. If the real-time data interpreter 73 detects a real-time command in the data sent from receiver section 31, the specific process indicated by the real-time command is executed with a priority over any process issued in accordance with commands stored in the receive buffer 32.

Data stored through the real-time data interpreter 73 to the receive buffer 32 is then read in the order stored by data interpreter 33, and the included data codes are interpreted. If a command is detected, a process preparing for command execution is run by the controller 38, and any print data is stored to the print buffer 37 in a format enabling the data to be printed.

Control data such as commands in the data interpreted by the data interpreter are modified to operation information and then stored to the action buffer 34. The operation information stored in the action buffer 34 is correlated to corresponding print data stored in the print buffer 37 as mentioned above. The operation information stored in the action buffer 34 is read and sequentially executed by the controller 38 in the order stored (FIFO as noted above). The controller controls the print processor 85 according to the operation information read from the action buffer 34, and sends the print data stored in the print buffer 37 to the print processor 85 to control the print processor and printing.

The controller 38 has functions for setting and controlling the print processor 85, managing print data, and monitoring the status of the various parts of printer 10. The results are output to the common status detector 79, which is part of the status detector 36.

For example, if the receive buffer 32 is nearly full or the printer temporally stops its operation waiting for a cut-sheet form to be inserted, the corresponding status is reported to the common status detector 79. If the printer mechanism 39 changes, for example, to a hold state in which data processing is paused because the printer cover is open, a paper jam causes a printer error, or a roll paper near-end state is detected, the print processor 85 passes the status information to the printer mechanism status detector 87, which is part of the status detector 36.

The status information detected by the common status detector 79 and printer mechanism status detector 87 is supplied to the status data generator 82 of status transmitter 80. The status transmitter 80 has a function for sending status information relating to the printer 10 to the host by means of automatic status reporter 81. This status information includes, for example, the receive buffer status and printer mechanism 39 status information accumulated in the status data generator 82. The automatic status reporter 81 sends status data when particular status information changes under control of the controller 38. Status information that triggers automatically sending the status information can be selected by a specific command from the host.

Status data output from the automatic status reporter 81 is supplied through transmission section 35 to interface 30, and forwarded to the RS-232C port driver 92 of the host. The status information is then relayed to the POS application software 97 by the POS OS 94, which includes a printer driver. The POS application software 97 then selects the process appropriate to the status of printer 10 so that it can control the printer 10 accordingly.

By providing such a status transmitter 80, status data is sent to the POS application software 97 when there is a change in a particular printer mechanism or printer 10 condition. The application can therefore determine the overall condition and status of the printer 10. Furthermore, because status data is reported only when there is a change in status, the processing load associated with status data sending and receiving is reduced on both the host and printer sides. Throughput can therefore be improved.

Buffer full status 79a detected by common status detector 79 and indicating that the receive buffer is full, and error cause (error status) 87a and hold state cause (hold status) 87b from the printer mechanism status detector 87, are also supplied to the busy status selector 89 of the communication enabling unit 88. If buffer full status 79a, error status 87a, or hold status 87b is detected, busy flag setting section 70 outputs a busy signal to the interface 30 to notify the host 90 that data transmission is prohibited. This prevents the loss of data sent from the host because it cannot be stored to the receive buffer on the communication terminal device side, that is, by the terminal printer 10.

More specifically, the RS-232C standard uses the DTR signal to achieve a busy signal function. The host-side RS-232C port driver 92 or printer driver 100, 101 sends data only when the DTR signal is active, and stops sending data when the printer 10 is off-line or buffer-full state and the DTR signal is thus inactive.

A configuration in which the POS application software 97 outputs to the printer 10 a command for confirming the status, or a command requesting more detailed status information, when the near-end detector status or other monitored status changes and status data is therefore reported is also possible. Normally, data received by the printer is accumulated in the receive buffer 32 in the order received, and command interpreting and processing occur in the order stored. Therefore, if a large amount of previous data is stored, it can take quite some time before starting the required command process.

Real-time commands are interpreted and processed by the real-time command interpreter before being transferred to the receive buffer, and thus preventing its execution from being delayed in such cases. Real-time commands are executed with no relationship to the order of any data or commands waiting in the receive buffer 32 for processing. Thus the host-side application can therefore immediately obtain status information from the printer and execute a specified process by issuing the real-time commands, thus enabling error recovery and other processes.

However, when an error occurs with a general printer or the printer enters a hold state, the busy status selector 89 of the communication enabling unit 88 determines that the printer is busy and operation is disabled. For this reason the communication enabling unit 88 sets the DTR signal inactive. The host OS 93 then pauses sending data to the printer 10 in response to the inactive DTR signal. The host OS 93 thus prevents a host-side POS application 97 from sending even a real-time command, for example, and host applications cannot send any commands to the printer 10.

The practical functionality of real-time commands is thus limited when a busy signal is output even if the POS application software 97 has a function for using real-time commands and the printer 10 has a function for interpreting and running real-time commands.

The busy status selector 89 of the communication enabling unit 88 in this exemplary embodiment of the present invention is therefore able to select factors causing busy signal output so that a busy signal is output only when a buffer full state or other major problem is possible.

By thus limiting the reasons for busy signal output to specific causes such as a buffer full state, the degree of freedom of the host application 97 is greatly improved but still not sufficient. When a paper jam occurs, for example, the application 97 repeatedly outputs numerous real-time commands to request a detailed status report and to confirm a change in status, for example. Certain print data may also be sent in advance of the printing operation so that printing can begin quickly after the paper jam is removed. There are also cases in which much data is already stored to the receive buffer at the time the paper jam occurs.

Conventional printers, on the other hand, cannot print when a paper jam occurs, and data in the receive buffer is therefore left in the buffer without being interpreted. The receive buffer can therefore soon become filled with real-time commands, for example. When the buffer becomes full, a busy signal is output as described above. This causes the host OS 93 to block sending data, and the application 97 is unable to handle the error.

To eliminate such problems, this preferred embodiment of the present invention continues interpretation of data in the receive buffer, processes preparing the print data, and other selected operations as described above even if printer 10 operation stops because of a paper jam or other error. Except for real-time commands, operation information based on the interpreted commands is stored to the action buffer 34 with a correlation to the corresponding print data. The information stored in the action buffer 34 are run in the stored sequence under the control of the controller after the error or other condition is resolved. Command interpreting can be set to continue for as long as storage space remains in the action buffer 34.

Command interpretation in this exemplary embodiment continues irrespective of the printer 10 status, and real-time commands are not accumulated in the receive buffer. The host can therefore send numerous real-time commands without filling the receive buffer, and the degree of freedom of host application software can be greatly improved.

Furthermore, because some plural lines of print data has already been prepared for printing by the time the error state or off-line state is corrected, printing the largest number of lines printable by the print head can begin at the same time that printing starts.

The control-related functions of both the above-described first and second embodiments can be achieved using CPU 40, ROM 43, RAM 44, and the like, as shown in FIG. 3. In this case the control process can be stored to a computer-readable data storage medium such as ROM, CD-ROM, or floppy disk and read by CPU 40 to create a load module. The control process can also be stored to the data storage medium in load module form so that it can be read directly therefrom and run, or copied therefrom and run.

Furthermore, these preferred embodiments of the invention have been described using, by way of example only, a terminal printer for a POS system as the communication terminal device of the accompanying claims. It will be apparent to those skilled in the related art, however, that the invention is not be limited to such printers. More particularly, the present invention can be applied to various types of communication terminal devices used with, for example, such transaction terminals as an ATM, cash dispenser, or kiosk terminal, where communication terminal device operation is controlled by data sent from a host device.

In the above embodiments, processing of the command information stored in the action buffer stops while the printer is off-line. However, the present invention is not limited to this particular situation. Rather, the present invention further encompasses the situation where the processing of the command information in the action buffer can continue as long as the command information can be processed in the off-line condition. In this case, if command information, which is impossible to process in the off-line condition, is encountered, the process stops until the printer returns to the on-line state.

Further, in the above embodiments, only real-time commands are killed or ignored in developing command information or image data in either the action buffer or the print buffer. However, the present invention is not so limited. Rather, predetermined data other than the real-time commands can also be ignored if such predetermined data is unnecessary for ordinary printer operations, thereby preventing the receive buffer from being filled with such data. For example, if the received data is not print data nor defined as a control command, it is preferable to ignore such trash data.

Effectiveness of the Invention

A communication terminal device according to the present invention interprets received data even when printer operation is temporarily stopped. Action commands in the interpreted data that require a subsequent mechanical operation to complete are stored in an action buffer, and print data is stored to the print buffer in a format enabling the data to be printed directly from the print buffer. Processing data in the receive buffer therefore continues even while printer operation is stopped. The receive buffer will therefore not become full, and control requests from the host can be more flexibly handled.

Furthermore, because print data continues to be readied in the print buffer while printer operation is paused, processing can continue rapidly once the printer recovers from whatever caused the printer to stop operating. In particular, because data is already buffered to the print buffer when the print operation requires printing plural consecutive lines, plural lines can be simultaneously printed immediately after printer operation is re-enabled.

While the invention and various aspects thereof have been described in conjunction with several specific embodiments, many further alternatives, modifications, applications and variations will be apparent to those skilled in the art in light of the foregoing description. Thus, the invention described herein is intended to embrace all such alternatives, modifications, applications and variations as may fall within the spirit and scope of the appended claims.

What is claimed is:

1. A communication terminal apparatus comprising:
   interface means for performing data communication with a host apparatus;
   first and second storage means for storing data;
   first data processing means for storing in said first storage means the data received by said interface means;
   interpretation means for reading out the received data from said first storage means in the order in which the received data are stored, and for interpreting the read data;
   first detection means for detecting predetermined data from the received data interpreted by said interpretation means;
   second detection means for detecting the predetermined data from the received data before the received data are stored in said first storage means;
   second data processing means for storing control information corresponding to the received data interpreted by said interpretation means in said second storage means in the order in which the received data are interpreted, except for the predetermined data detected by said first detection means; and
   first control means for controlling said communication terminal apparatus based on said control information stored in said second storage means.

2. A communication terminal apparatus according to claim 1, wherein said control information comprises printing control information and print data, and said second data processing means stores in said second storage means the printing control information and the print data and relates each item of printing control information with a corresponding item of print data.

3. A communication terminal apparatus according to claim 2, wherein said second storage means comprises a printing control information area for storing the printing control information and a print data area for storing the print data, and said second data processor adds addresses within the print data area by which print data is related to corresponding printing control information, and stores the printing control information in the printing control information area.

4. A communication terminal apparatus according to claim 1, further comprising:
   second control means for controlling said communication terminal apparatus with a higher priority than said first control means in accordance with the predetermined data detected by said second detection means.

5. A communication terminal apparatus according to claim 4, wherein said second control means sends status data of said communication terminal apparatus to said host apparatus in accordance with the predetermined data.

6. A communication terminal apparatus according to claim 1, further comprising:
   state detection means for detecting a predetermined state of said communication terminal apparatus; and
   interruption means for interrupting an operation of said first control means in response to said state detection means detecting the predetermined state;
   wherein said interpretation means interprets the received data even while said first control means is interrupted.

7. A received data processing method for a communication terminal comprising the steps of:
   (a) performing data communication with a host;
   (b) storing the data received in step (a) in a first storage area;
   (c) detecting predetermined data from the received data before the received data are stored in step (b);
   (d) reading the received data stored in step (b) in the order in which the received data are stored;
   (e) interpreting the data read in step (d);
   (f) detecting the predetermined data from among the received data interpreted in step (e);
   (g) storing control information corresponding to the received data interpreted in step (e) in a second storage area, different from said first storage area, in the order in which the received data are interpreted, except for the predetermined data detected in step (f) and
   (h) controlling the communication terminal based on said control information stored in step (g).

8. A method according to claim 7, wherein said control information comprises printing control information and print data, and in step (g) the printing control information and the print data are stored with relation to each other.

9. A method according to claim 8, wherein step (g) comprises the steps of:
   (g1) storing the print data;
   (g2) adding address information of the stored print data to the printing control information related to the print data; and (g3) storing the printing control information and the address information.

10. A method according to claim 7 further comprising the steps of:

(j) controlling said communication terminal with a higher priority than in step (h) in accordance with the predetermined data detected in step (c).

11. A method according to claim 7, wherein step (c) comprises the step of (c1) sending status data of said communication terminal to said host according to the predetermined data.

12. A method according to claim 7, further comprising the steps of:

(k) detecting a predetermined state of said communication terminal; and (l) interrupting processing in step (h) in response to detection of the predetermined state in step (k);

wherein at least step (d) through step (g) are performed even if step (l) is performed.

13. A computer program product comprising a control program for implementing on a computer a received data processing method for a communication terminal, said control program comprising instructions for:

(a) performing data communication with a host;

(b) storing the data received in (a) in a first storage area;

(c) detecting predetermined data from the received data before the received data are stored in step (b);

(d) reading the received data stored in (b) in the order in which the received data are stored;

(e) interpreting the data read in (d);

(f) detecting the predetermined data from among the received data interpreted in (e);

(g) storing control information corresponding to the received data interpreted in (e) in a second storage area, different from said first storage area, in the order in which the received data are interpreted, except for the predetermined data detected in (f); and (h) controlling the communication terminal based on said control information stored in (g).

14. A computer program product according to claim 13, wherein said control information comprises printing control information and print data, and in (g) the printing control information and the print data are stored with relation to each other.

15. A computer program product according to claim 14 wherein (g) comprises the instructions for:

(g1) storing the print data;

(g2) adding address information of the stored print data to the printing control information related to the print data; and (g3) storing the printing control information and the address information.

16. A computer program product according to claim 13, further comprising instructions for:

(j) controlling said communication terminal with a higher priority than in (h) in accordance with the predetermined data detected in (c).

17. A computer program product according to claim 13, wherein (c) comprises instructions for (c1) sending status data of said communication terminal to said host according to the predetermined data.

18. A computer program product according to claim 13, further comprising instructions for:

(k) detecting a predetermined state of said communication terminal; and (l) interrupting processing in (g) in response to detection of the predetermined state in (k);

wherein at least (d) through (g) are performed even if (l) is performed.

19. A communication terminal apparatus comprising:

an interface for performing data communication with a host apparatus;

first and second storage mediums for storing data;

a first data processor for storing in said first storage medium the data received by said interface;

an interpreter for reading out the received data from said first storage medium in the order in which the received data are stored, and for interpreting the read data;

a first detector for detecting predetermined data from the received data interpreted by said interpreter;

a second detector for detecting the predetermined data from the received data before the received data are stored in said first storage medium;

a second data processor for storing control information corresponding to the received data interpreted by said interpreter in said second storage medium in the order in which the received data are interpreted, except for the predetermined data detected by said first detector; and a first controller for controlling said communication terminal apparatus based on said control information stored in said second storage medium.

20. A communication terminal apparatus according to claim 19, wherein said control information comprises printing control information and print data, and said second data processor stores in said second storage medium the printing control information and the print data and relates each item of printing control information with a corresponding item of print data.

21. A communication terminal apparatus according to claim 20, wherein said second storage medium comprises a printing control information area for storing the printing control information and a print data area for storing the print data, and said second data processor adds addresses within the print data area by which print data is related to corresponding printing control information, and stores the printing control information in the printing control information area.

22. A communication terminal apparatus according to claim 19, further comprising:

a second controller for controlling said communication terminal apparatus with a higher priority than said first controller in accordance with the predetermined data detected by said second detector.

23. A communication terminal apparatus according to claim 22, wherein said second controller sends status data of said communication terminal apparatus to said host apparatus in accordance with the predetermined data.

24. A communication terminal apparatus according to claim 19, further comprising:

a state detector for detecting a predetermined state of said terminal apparatus; and communication an interruption unit for interrupting an operation of said first controller response to said state detector detecting the predetermined state;

wherein said interpreter interprets the received data even while said first controller is interrupted.

25. A communication terminal apparatus comprising:

means for performing data communication with a host apparatus;

first and second means for storing data;

first data processing means for storing in said first storing means the data received by said performing means;

second detecting means for detecting predetermined data from the received data before the received data are stored in said first storage means;

means for reading out the received data from said first storing means in the order in which the received data are stored, and for interpreting the read data;

first detecting means for detecting the predetermined data from the received data interpreted by said reading and interpreting means;

second data processing means for storing control information corresponding to the received data interpreted by said reading and interpreting means in said second storing means in the order in which the received data are interpreted, except for the predetermined data detected by said first detecting means; and first controlling means for controlling said communication terminal apparatus based on said control information stored in said second storing means.

26. A communication terminal apparatus according to claim 25, wherein said control information comprises printing control information and print data, and said second data processing means stores in said second storing means the printing control information and the print data and relates each item of printing control information with a corresponding item of print data.

27. A communication terminal apparatus according to claim 26, wherein said second storing means comprises a printing control information area for storing the printing control information and a print data area for storing the print data, and said second data processing means adds addresses within the print data area by which print data is related to corresponding printing control information, and stores the printing control information in the printing control information area.

28. A communication terminal apparatus according to claim further comprising:

second controlling means for controlling said communication terminal apparatus with a higher priority than said first controlling means in accordance with the predetermined data detected by said second detecting means.

29. A communication terminal apparatus according to claim 28, wherein said second controlling means sends status data of said communication terminal apparatus to said host apparatus in accordance with the predetermined data.

30. A communication terminal apparatus according to claim 25, further comprising:

state detecting means for detecting a predetermined state of said communication terminal apparatus; and means for interrupting an operation of said first controlling means in response to said state detecting means detecting the predetermined state;

wherein said reading and interpreting means interprets the received data even while said first controlling means is interrupted.

* * * * *

UNITED STATES PATENT AND TRADEMARK OFFICE
CERTIFICATE OF CORRECTION

PATENT NO. : 6,629,790 B2
DATED : October 7, 2003
INVENTOR(S) : Masayo Miyasaka et al.

It is certified that error appears in the above-identified patent and that said Letters Patent is hereby corrected as shown below:

Column 16,
Line 3, change "(l) interrupting processing in (g) in response to detection of the predetermined state in (k);" to -- (l) interrupting processing in (h) in response to detection of the predetermined state in (k); --

Column 18,
Line 11, after "claim", insert -- 25, --

Signed and Sealed this

Tenth Day of February, 2004

JON W. DUDAS
*Acting Director of the United States Patent and Trademark Office*